2,811,482
Patented Oct. 29, 1957

2,811,482

ADRENOCORTICOTROPHIN AND OXYPOLYGELATIN COMPOSITIONS

Charles W. Damaskus, La Grange, Ill., assignor to Armour and Company, Chicago, Ill., a corporation of Illinois No Drawing. Application December 29, 1954,
Serial No. 478,501

3 Claims. (Cl. 167—74)

This invention relates to an adrenocorticotrophin preparation suitable for intramuscular or subcutaneous injection and having an enhanced adrenocorticotrophic effect.

The adrenocorticotrophic hormone is a substance secreted by the anterior lobe of the pituitary gland and presumably is carried by the blood stream in the animal body to the adrenal gland where it exerts an influence on the development, growth, and activity of the adrenal cortex. In relatively recent years, extracts of the adrenocorticotrophic hormone derived from the pituitary glands of animals such as hogs, sheep, and cattle have been found extremely effective in alleviating certain pathological conditions in human beings when injected parenterally, and there has been an increasing demand for quantities of the hormone suitable for injection into the human body.

In view of the relatively short supply of animal pituitary glands, from which the adrenocorticotrophic hormone is obtained, and in view of the extremely small size and content of the pituitary glands themselves, it is of importance that methods be developed not only for obtaining the utmost in yield of active substance from the available glands but also for increasing the potency of the active substance to as great an extent as possible.

One approach to the above problem is described in the co-pending application of Robert E. Thompson, Serial No. 328,268, filed December 27, 1952, now Patent No. 2,669,537, wherein it is disclosed that the adrenocorticotrophic hormone, when employed with gelatin as the vehicle, is significantly more potent than the same adrenocorticotrophic hormone injected in an ordinary aqueous solution. As pointed out in the aforesaid application, the magnification of effect resulting from the use of gelatin has been found to be a doubling or tripling of adrenocorticotrophic potency. It appears that the action of gelatin upon the adrenocorticotrophic hormone brings about a desirably sudden, strong onset of the hormonal activity and that the pattern of response is substantially the same as that caused by an aqueous solution of the hormone, except that a much smaller dose of the gelatin-ACTH is required to maintain the patient in remission than is the case when aqueous-ACTH is employed. This unique effect of the gelatin upon ACTH has not been demonstrated with any of the other carriers or vehicles commonly employed for injectable pharmaceuticals.

An object of the present invention is to provide an adrenocorticotrophin-gelatin preparation which possesses an even greater potency than those disclosed in the aforesaid application. A further object of the invention is to provide a combination of adrenocorticotrophin with a special type of gelatin carrier which is safe and convenient for intramuscular or subcutaneous injection while at the same time exhibiting a coaction or cooperation between the hormone and carrier resulting in a substantially greater magnification of adrenocorticotrophic effect than is obtained with other types of gelatin. Other objects and advantages of the invention will appear as the specification proceeds.

The product of the present invention is an adrenocorticotrophin preparation, comprising adrenocorticotrophin substance and oxypolygelatin. The adrenocorticotrophic hormone employed in combination with oxypolygelatin as the vehicle is substantially more potent than the same adrenocorticotrophic hormone injected in any other known types of gelatin and is of course even more potent than the same hormone in an ordinary aqueous solution. The magnification of effect resulting from the use of oxypolygelatin has been found to be a doubling or tripling of ACTH potency over that obtained with other types of gelatin.

The above-described increase in effect is a true potentiation, as distinguished from a mere retarding effect which may sometimes be caused by the viscosity of the vehicle. This may be illustrated by the fact that the oxypolygelatin-adrenocorticotrophin preparation produces, immediately upon injection, a sudden strong response which is greatly in excess of the response caused by an equal dose of the same substance in an aqueous solution from which the oxypolygelatin is omitted. It has been found that during the 24-hour period following injection, the pattern of response to a given dose of oxypolygelatin-adrenocorticotrophin is similar to that of an identical dose of saline-adrenocorticotrophin, except that the oxypolygelatin-adrenocorticotrophin response is always stronger at any particular point of time, as if a much greater dosage had been given. This type of reaction cannot be explained merely on the basis of absorption retardation but is believed to be based on a unique property of the oxypolygelatin which is displayed when it is used with the adrenocorticotrophic hormone but not when it is used with other biologically active substances.

Oxypolygelatin, the vehicle employed in the present invention, is a well-known substance, fully described in the literature and readily available on the market. (See, for example, the article by Campbell et al. entitled, "The Preparation and Properties of a Modified Gelatin (Oxypolygelatin) as an Oncotic Substitute for Serum Albumin," Texas Reports on Biology and Medicine, volume 9, number 2, pages 235–280, Summer, 1951.) Generally, oxypolygelatin is prepared by coupling gelatin molecules into larger complexes with a condensing or coupling agent and then subjecting the large molecular weight gelatin polymer to an oxidation step wherein the molecule is degraded to a desired size and configuration. A preferred method for producing oxypolygelatin involves condensation of gelatin with glyoxal and subsequent oxidation with hydrogen peroxide. It is believed that the shape of the oxypolygelatin is altered from the spindle-like form of the original gelatin to a more nearly spherical form.

Oxypolygelatin has been developed and used primarily as a plasma volume expander, and its unique effect when used as a vehicle for the adrenocorticotrophic hormone has not heretofore been known. However, when its known properties of non-toxicity, non-antigenicity, and non-pyrogenicity are considered together with its previously unknown property of magnifying the potency of adrenocorticotrophin, its utility as a vehicle for this hormone becomes immediately important.

It is preferred to use about a 35 to 40% aqueous solution of oxypolygelatin in preparing the product of the present invention. It is usually desirable that the oxypolygelatin concentration be within the range of about 5 to 50% by weight of the injection solution, although the effectiveness of the oxypolygelatin in increasing adrenocorticotrophin potency is manifested to some degree even at oxypolygelatin concentrations above and below these limits.

Any adrenocorticotrophic substance may be used with oxypolygelatin to provide the improved adrenocorticotrophic effectiveness contemplated by the present invention. The adrenocorticotrophic hormone has not yet been isolated, and its molecular structure has not as yet been definitely characterized. It is believed to be a protein, and certain processes of preparation are believed by some to result in a polypeptide molecule containing the adrenocorticotrophic activity. It is preferred in the present invention to employ a fairly well purified substance, but any of the known adrenocorticotrophic substances, whether in the so-called "whole protein" form or the "polypeptide" form, and regardless of their source or preparative history, may be used with oxypolygelatin to obtain the improved results of this invention.

The exact manner in which the active substance and the oxypolygelatin coact or cooperate to provide the increased potency is not known with certainty at the present time. A possible explanation may be that the oxidation reaction which the oxypolygelatin undergoes provides the molecule with an increased number of acidic carboxyl groups which may cause the oxypolygelatin to combine with the basic adrenocorticotrophin to form a chemical complex having an increased adrenocorticotrophic activity. A further, or perhaps alternative, explanation is that the oxypolygelatin, when used in combination with the adrenocorticotrophic hormone, may possess a specific stabilizing effect upon the hormone, thus protecting it against inactivation by certain enzymes or other destructive forces surrounding the site of injection. At any rate, potency assays as well as clinical studies on patients undergoing ACTH treatment have demonstrated that the use of oxypolygelatin provides a substantially greater response from each dose of the hormone than is the case when saline, or even other types of gelatin, are used as the vehicle.

Specific examples illustrating the invention are described as follows:

*Example I*

A quantity of adrenocorticotrophin was prepared by extracting acetone dehydrated anterior pituitaries of hogs with glacial acetic acid at 70° C.; adding ½ volume of acetone and a small portion of NaCl to the solution to precipitate unwanted materials; adding an equal volume of ethyl ether to the solution to precipitate a crude adrenocorticotrophin; purifying the precipitate by adsorption on oxycellulose and elution therefrom; and adding resin to the eluate to convert the adrenocorticotrophin to the acetate. The solution thus formed was lyophilized to provide a dry powder, which was reconstituted with pyrogen-free distilled water, sterile filtered, vialed at 40 U. S. P. units per vial, frozen, and lyophilized.

The above lyophilized product, which is of the type sometimes referred to as the "polypeptide" form of adrenocorticotrophin, was reconstituted with a solution containing 37% oxypolygelatin and 0.5% phenol. The resulting solution, containing adrenocorticotrophin, 37% oxypolygelatin, and 0.5% phenol, was subjected to standard clinical assay and was found to be about two to three times as potent as the original adrenocorticotrophin administered in ordinary gelatin.

The oxypolygelatin solution referred to above was prepared from a standard oxypolygelatin solution obtained on the market. The standard solution had been prepared by condensation of gelatin with glyoxal, followed by oxidation with hydrogen peroxide, and was received as a 5% oxypolygelatin solution in normal saline. This was prepared for use in the present example by dialyzing out the normal saline, concentrating the solution by vacuum distillation to 37% oxypolygelatin, adding phenol to 0.5% concentration, and sterile filtering. The resulting solution was then used with the lyophilized adrenocorticotrophin as described in the preceding paragraph.

*Example II*

Lyophilized adrenocorticotrophin, prepared as in Example I above, was reconstituted with 16% gelatin to an ACTH potency of 16.5 units/0.5 ml.

The above base solution was divided into two equal parts and used to prepare solutions A and B as follows:

Solution A was prepared by diluting the base solution to .040 unit/0.5 ml. with 16% gelatin containing 0.5% phenol.

Solution B was prepared by diluting the base solution to .040 unit/0.5 ml. with 37% oxypolygelatin containing 0.5% phenol.

Solutions A and B were then assayed by the standard method involving adrenal ascorbic acid depletion test on hypophysectomized rats, and it was found that solution B (containing oxypolygelatin) possessed a potency of about 150–200% that of solution A (containing ordinary gelatin only).

*Example III*

Lyophilized adrenocorticotrophin, prepared as in Example I above, was reconstituted with 16% gelatin to an ACTH potency of 16.5 units/0.5 ml.

The above base solution was divided into two equal parts and used to prepare solution C and D as follows:

Solution C was prepared by diluting the base solution to .120 unit/0.5 ml. with 16% gelatin containing 0.5% phenol.

Solution D was prepared by diluting the base solution to .120 unit/0.5 ml. with 37% oxypolygelatin containing 0.5% phenol.

Solutions C and D were then assayed by the standard method involving the adrenal ascorbic acid depletion test on hypophysectomized rats, and it was found that solution D (containing oxypolygelatin) possessed a potency of about 150–200% that of solution C (containing ordinary gelatin only).

Whenever the word "unit" is referred to herein in connection with ACTH potency, I mean the "International Unit" which has been odopted by the World Health Organization. One "International Unit" is defined as equivalent to the potency of 1 mg. of preparation LA–1–A when tested by the method of M. Sayers, G. Sayers, and L. A. Woodbury, Endocrinology, 42, 379 (1948).

While in the foregoing specification specific embodiments of this invention have been set out in considerable detail for the purpose of illustration, it will be apparent to those skilled in the art that many of the details set forth may be varied widely without departing from the spirit of the invention.

This application is a continuation-in-part of my application Serial No. 380,099, filed September 14, 1953.

I claim:

1. An adrenocorticotrophin preparation comprising adrenocorticotrophin substance and oxypolygelatin.

2. An adrenocorticotrophin preparation comprising adrenocorticotrophin substance and a 5 to 50% aqueous solution of oxypolygelatin.

3. An adrenocorticotrophin preparation comprising adrenocorticotrophin substance and an aqueous solution containing oxypolygelatin in a concentration of about 35 to 40%.

References Cited in the file of this patent

UNITED STATES PATENTS 2,591,133     Campbell _____ Apr. 1, 1952

OTHER REFERENCES

Ingle et al.: Proc. Soc. Exptl. Biol. and Med., vol. 79, No. 1, January 1952, p. 128.

Bates: Endocrinology, vol. 52, March 1953, pp. 266 to 271, Li—The Suprarenal Cortex (Joffey), 1953 pp. 1–3.